June 1, 1937.  W. S. LUCKETT  2,082,071
HOGSHEAD
Filed Jan. 9, 1936  3 Sheets-Sheet 1
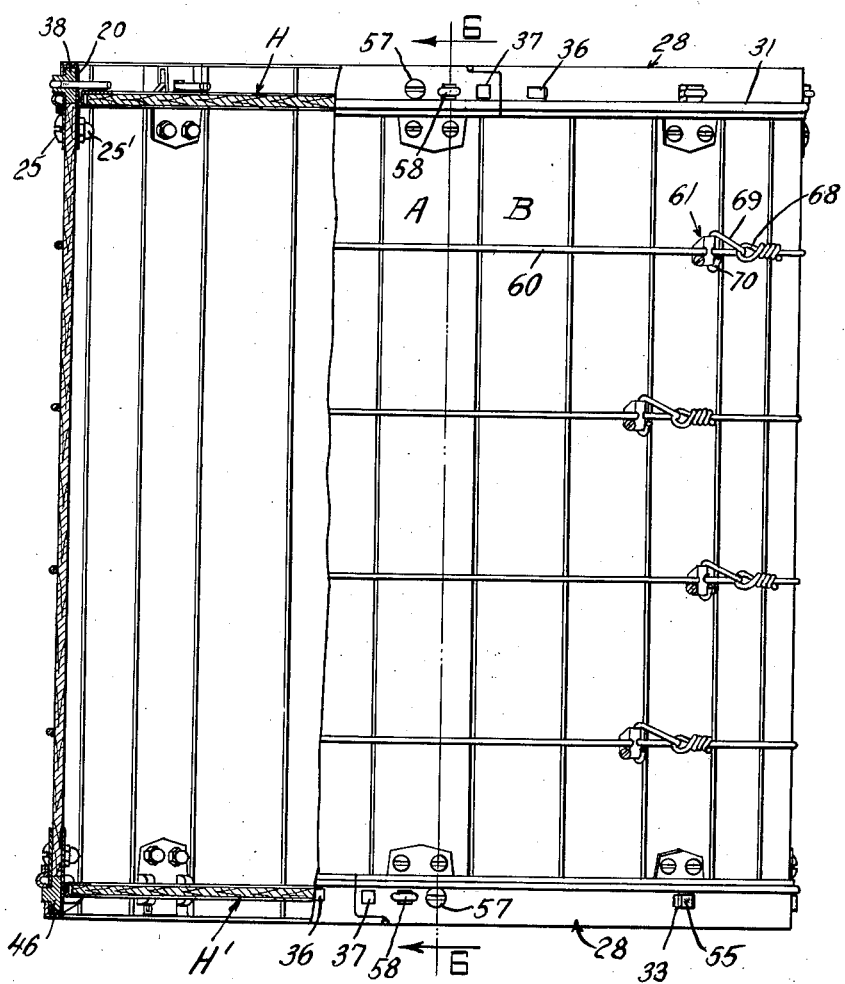
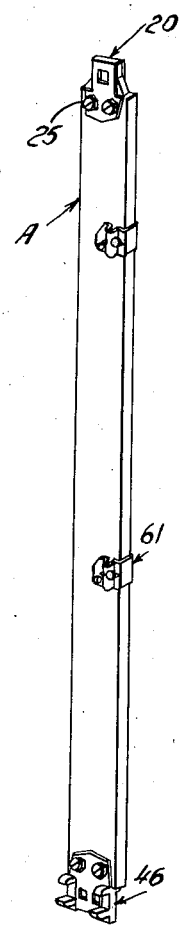
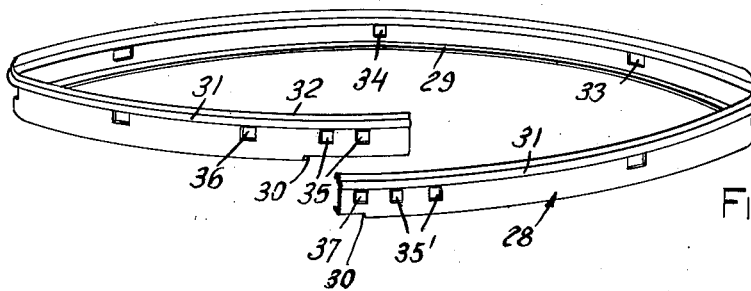
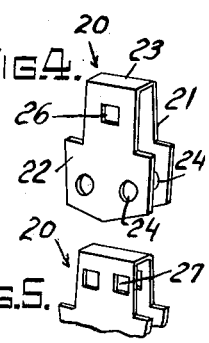
INVENTOR.
WILLIAM S. LUCKETT
BY
ATTORNEYS June 1, 1937. W. S. LUCKETT 2,082,071
HOGSHEAD
Filed Jan. 9, 1936 3 Sheets-Sheet 2
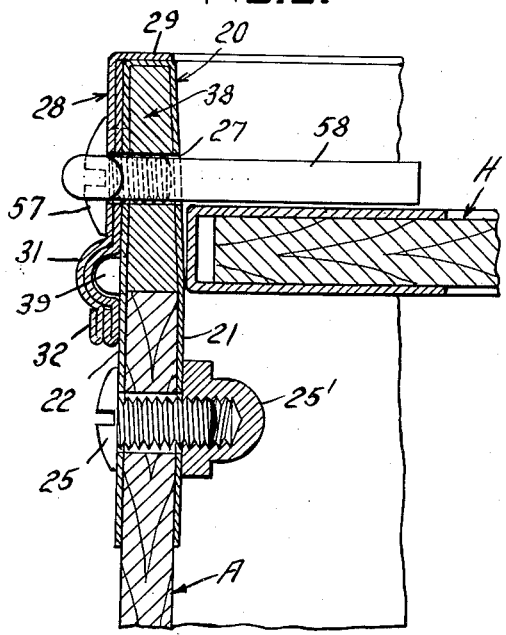
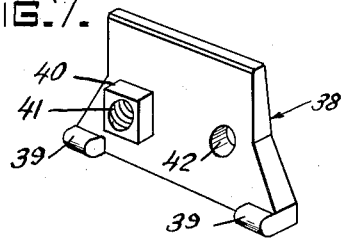
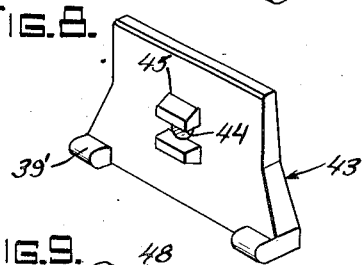
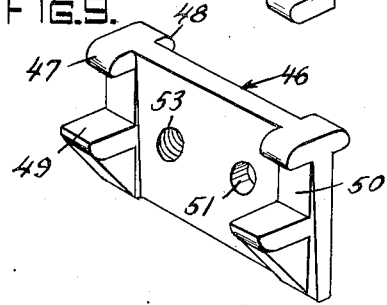
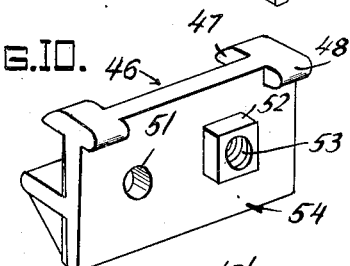
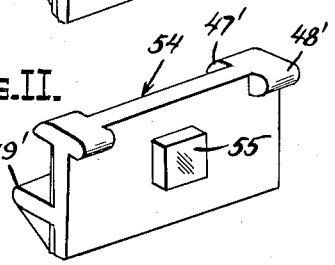
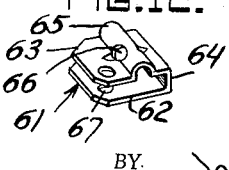
INVENTOR.
WILLIAM S. LUCKETT
BY Marshall H Hawley
ATTORNEYS June 1, 1937.  W. S. LUCKETT  2,082,071
HOGSHEAD
Filed Jan. 9, 1936  3 Sheets-Sheet 3
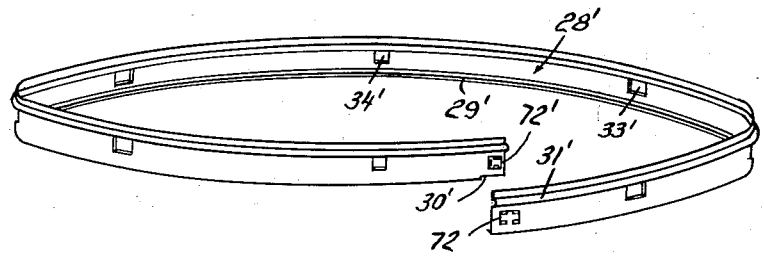
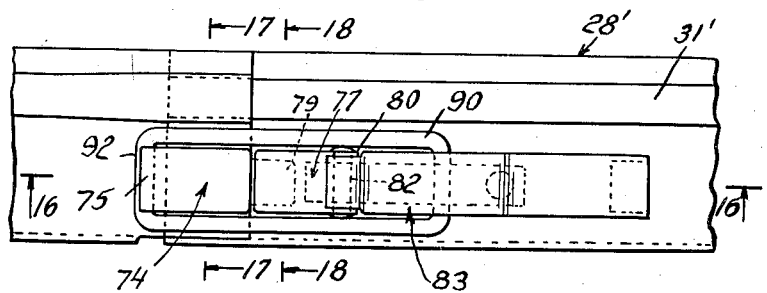
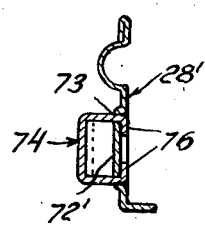
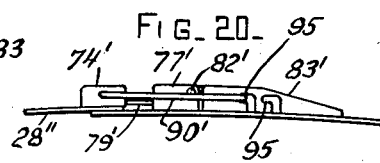
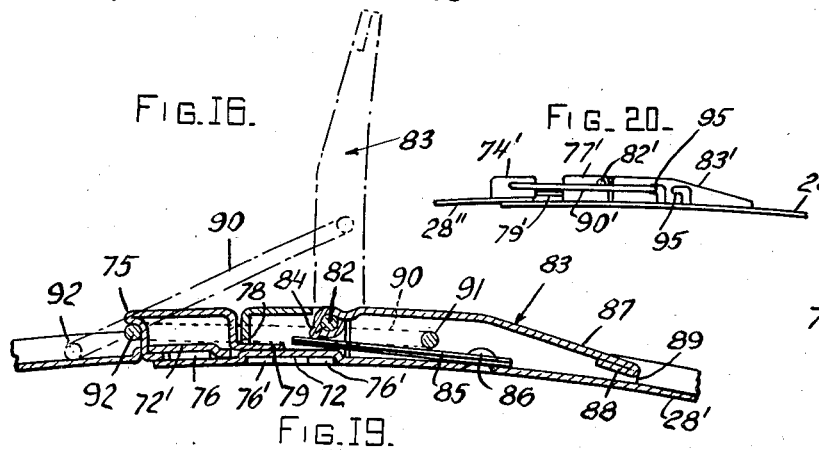
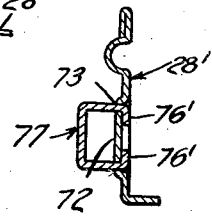
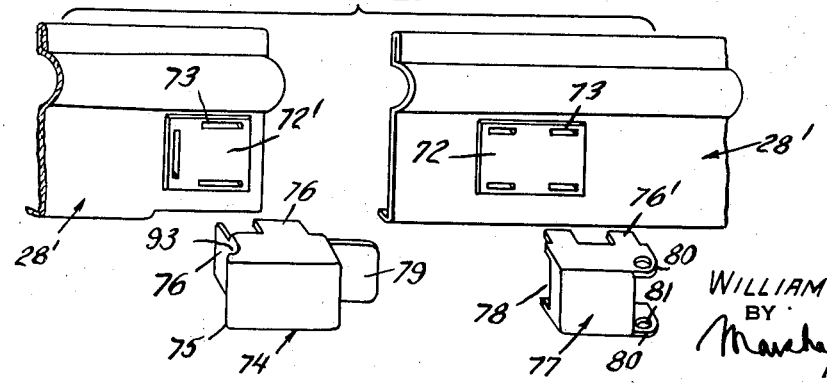
INVENTOR
WILLIAM S. LUCKETT
BY
ATTORNEYS Patented June 1, 1937

2,082,071

UNITED STATES PATENT OFFICE 2,082,071

HOGSHEAD

William S. Luckett, New York, N. Y.

Application January 9, 1936, Serial No. 58,331

9 Claims. (Cl. 217—44)

My present invention relates to improvements in hogsheads or the like, especially adapted for use in storing, aging, and shipping leaf tobacco, though of course the hogsheads embodying the present invention may be used for other purposes.

As is well known, leaf tobacco is cut and cured by the growers or farmers, after which it is graded and taken in a loose state to auction warehouses where it is sold to the manufacturers of tobacco products or to leaf tobacco dealers. The manufacturers of tobacco products, as well as the leaf tobacco dealers, take the tobacco to their plants where, after certain preliminary treatments, it is packed in hogsheads which are then stored in properly ventilated storage warehouses and allowed to remain in the hogsheads and storage warehouses for a considerable length of time, that is, generally from two to three years for aging purposes.

For a great many years it has been the general custom, and at the present time it is the general practice, to construct the hogsheads on the premises or adjacent the premises where the tobacco is to be stored for aging purposes. In constructing the hogsheads a great quantity of staples and nails are used in securing the staves, hoops and heads of the hogsheads in place. Due to the fact that the tobacco sweats in the hogsheads at certain times, and also because of rough handling of the hogsheads, a great many of the staples and nails become loosened, and the hoops originally secured in place thereby fall off of the hogsheads.

With the foregoing in mind the principal general object of my present invention resides in the provision of a knock-down hogshead which may be assembled and disassembled with facility and in a very short period of time by one person, and which, when assembled, possesses great strength so that it will withstand all pressures, stresses, and forces created and encountered during the packing of the tobacco in the hogsheads, during aging and sweating of the tobacco in the hogshead, and during handling of the hogsheads, that is, when loading the hogsheads, storing them, unloading them, and shipping them.

An important object of the present invention is to provide a knockdown hogshead comprising generally a group of staves encircled or bent at their ends by similar hoops or bands, and to provide means on certain of the staves and on the hoops or bands for holding all of the staves in assembled relation to form the sides or wall of the hogshead.

Another important object of the present invention is to provide simple but effective means for detachably holding the hoops or bands around the ends of the hogsheads and for drawing the ends of the hoops or bands toward each other during the assembly of the parts, and also providing for quick and easy removal of the hoops or bands when disassembling the hogshead.

Another object of the invention is to provide simple means for re-enforcing wire hoops around the staves intermediate the ends of the hogshead, said means being so constructed and arranged as to definitely locate the wire hoops at predetermined intervals and to firmly maintain the hoops around the staves.

The foregoing and other objects and advantages of the invention will become more apparent and will be pointed out in detail during the course of the following description of the accompanying drawings, in which Fig. 1 is a side elevation of a hogshead embodying one form of the present invention, the hogshead being shown partly broken away and with parts in section;

Fig. 2 is a perspective view of one of the attaching staves with elements for holding the heads and the wire hoops shown applied to the stave;

Fig. 3 is a perspective view of an end hoop before its application to the hogshead;

Figs. 4 and 5 are perspective views of devices for holding the attaching elements on the ends of the attaching staves:

Fig. 6 is an enlarged fragmentary sectional view taken on the line 6—6 of Fig. 1;

Fig. 7 is a perspective view of a plate used in connection with the top hoop of Fig. 1 to hold the ends thereof together, and also to hold top head in place;

Fig. 8 is a view of another plate used in connection with the top hoop of Fig. 1 and the attaching staves to hold the top head in place;

Figs. 9 and 10 are perspective views, taken from the front and the rear respectively, of attaching plates used in connection with the bottom hoop of Fig. 1 to hold the ends of the hoop together and to hold bottom head in place;

Fig. 11 is a view similar to Fig. 10 of another form of attaching plate for the bottom hoop of Fig. 1;

Fig. 12 is a perspective view of one of the clips which hold the wire hoops in place;

Fig. 13 is a perspective view of a removable cotter or key to hold the top head in place;

Fig. 14 is a view similar to Fig. 3 showing a modification in the hoop;

Fig. 15 is a front elevation of the ends of the hoop of Fig. 14 in overlapping relation with a different type of fastening means to hold the ends in overlapping relation;

Fig. 16 is a view taken on the line 16—16 of Fig. 15;

Figs. 17 and 18 are sectional views taken on the lines 17—17 and 18—18, respectively, of Fig. 15;

Fig. 19 is an exploded perspective view on an enlarged scale of the ends of the hoop of Fig. 14 and parts of the attaching elements of Figs. 15—18; and Fig. 20 is a side view generally similar to Fig. 16 showing a further modification in the invention.

In the drawings the letter A designates certain of the staves which I term the attaching staves since they are provided with means for securing the end closures or heads in place. These staves are arranged at desired intervals around the hogshead, and plain staves B are arranged intermediate the staves A to complete the wall or sides of the hogshead. The staves may be formed of plain board, ply-wood, or other suitable material. Clips designated generally by the numeral 20 are secured to the ends of the staves A to receive and hold in place the attaching plates which secure the end closures or heads in place. The clips 20 are formed from metal plates bent upon themselves or otherwise fashioned to form opposite arms 21, 22 connected by top portion 23. The arms 21, 22 are provided with alined openings 24 to receive rivets or bolts 25 which extend also through the staves A. I prefer to use, and have shown relatively long nuts 25' on the ends of the bolts 25 to secure the clips 20 to the ends of the staves A, and for another purpose hereinafter pointed out. The combined length of the staves A and the clips 20 secured thereto and extending beyond the ends of the staves is substantially the same as the entire length of the staves B.

Certain of the clips 20 are provided with a single opening 26 as shown in Fig. 4, while other of the clips are provided with double openings 27 as shown in Fig. 5. The openings 26 and 27 receive elements on the attaching plates presently described and held on the ends of the staves by the clips 20 to maintain the end hoops or bands in place and to facilitate securing said bands around the ends of the hogshead and to maintain the end closures in place as presently described.

In Fig. 3 I have shown a perspective view of one of the end hoops designated generally by the numeral 28. All of the hoops, that is, the hoops for each end of the hogshead are of the same construction, and Fig. 3 shows one of the hoops in the position it would occupy on the lower end of the hogshead, it being obvious that by inverting the position of the hoop in Fig. 3 the same may be readily applied to the upper end of the hogshead. The hoops have along one edge an inwardly extending flange 29, which is cut away adjacent the ends of the hoop as designated by the numeral 30. Adjacent the other edge of the hoops there is formed a bead 31 above which the hoops are bent upon themselves as indicated by the numeral 32 (shown best in Fig. 6) to increase the strength of the hoops along said edges, and entirely around the hogshead. The hoops are also provided at definite intervals with elongated openings 33 and at their approximate centers with smaller openings 34. Adjacent the ends of the hoops are pairs of openings 35, 35' adapted to be brought into registry to receive detachable fastening elements as presently described. Inwardly from the openings 35 at one end of the hoops there is an opening 36, and near the other end of the hoop an opening 37, which are adapted to receive the arms of conventional instruments for drawing the hoop around the hogshead to bring the pairs of openings 35, 35' into registry to receive the fastening elements.

In Figs. 7 and 8 I have shown the attaching plates which are secured to certain of the staves A to cooperate with the detachable fastening elements and the hoops 28. Referring to Fig. 7 the numeral 38 designates generally one of the attaching plates used in connection with the top of the hogshead to hold the ends of the hoop 28 in overlapping relation. It will be noted that the plate 38 is provided on its bottom edge with projections or lugs 39 adapted to seat in the bead 31 of the hoop 28 as shown in Fig. 6. Adjacent one end of the plate 38 and on one face thereof there is a rectangular projection 40 having a screw threaded opening 41. In horizontal alinement with the opening 41 and adjacent the other end of the plate 38 is a plain opening 42. The openings 41, 42 are spaced apart a distance substantially the same as the respective pairs of openings 35, 35' on the hoop 28. It will be understood, of course, that the hoop 28 shown in Fig. 3 when used on the top of the hogshead would be inverted so that the bead 31 would coincide with the projections 39 as shown in Fig. 6, as well as projections 39'.

The plates 38 are secured to one of the staves A by means of clips, such as shown in Fig. 5, that is, U-shaped members having a pair of spaced openings 27 which are alined with the openings 41, 42 of the plates 38. I wish to point out that preferably only one of the staves A has secured to its upper end a plate 38, and it is this stave over which the ends of the hoop 28 are overlapped. The other staves A have secured at their upper ends plates 43 shown in detail in Fig. 8, and generally similar in design and structure to the plates 38 with the following exceptions. Instead of having two openings the plates 43 have only one centrally located opening 44 at opposite sides of which are inwardly projecting lugs or lips 45 of relative dimension to fit within the openings 33, 34 of the hoop 28. The lower edges of the plates 43 are provided with projections 39' similar to the projections 39 and also adapted to be seated in the bead 31 of the hoop 28. In this connection it will be noted that the width of the upper portion of the clips 20 is such as to permit the projections 39 to extend outwardly beyond the clips 20 so as to seat in the bead when the hogshead is assembled as presently described.

The attaching plates carried by the other or lower ends of the staves A for securing the bottom head in place are illustrated in detail in Figs. 9—11. In Figs. 9 and 10 the numeral 46 designates one of the attaching plates carried by the lower end of one of the staves A, preferably the same stave as that which carries the plate 38. At the upper corners of the plates 46, and on opposite sides thereof, are lateral projections 47, 48 respectively. In spaced relation to the projections 47 are similar projections 49 which provide at opposite ends of the plates channels 50 to receive the lower head as presently described, that is, the lower head is located between the respective projections 47, 49 on the plates 46 and the projections 48 receive the bead 31 of the lower loop in the same manner as the projections 39, 39' receive the same bead at the top of the hogshead. It will also be noted that each plate 46 is provided with a plain opening 51, similar to opening 42 of plate 38, and with a lateral rectangular projection 52, similar to the projection 40, and having a screw threaded opening 53 therethrough. The other staves A are provided at the lower ends with plates shown in Fig. 11 and designated generally by the numeral 54. Each of these plates has projections 47', 48', 49' corresponding to the projections 47, 48, 49 of plates 46 and serving the same purpose. The plates 54 are preferably not provided with openings to receive fastening elements, but have on one face thereof between the projections 48 a rectangular lug or projection 55.

I have designated the top head by the letter H and bottom head by H'. Each of said heads is shown with a center wooden panel surrounded by a metal channel to permit shifting movements of the wooden panel to prevent breakage when the hogsheads are dropped.

In setting up the hogsheads the lower head H' is placed on any suitable support above the floor or other surface, and the staves A and B are arranged substantially as shown in Fig. 1 in alternating relation around the support with the edge or margin of the head H' between the projections 47, 49 on plates 46, and 47', 49' on plates 54, which plates as previously stated are carried on the lower ends of the staves A. One of the bands or hoops 28 is arranged exteriorly of the lower ends of the said staves in the position of Fig. 3 so that the lower ends of the staves rest above flange 29. Any suitable compressing tool is then engaged in the openings 36, 37 of the band 28 with the opening 34 receiving one of the projections 55 on one of the plates 54 to properly center the hoops. As the ends of the hoop are brought into overlapping relation to establish the pairs of openings 35, 35' in registry, projections 55' on other of the plates 54 are received in openings 33. It will be noted that the openings 36 and 37 are to one side of the pairs of openings 35, 35', so that the workman may use one hand in manipulating the compressing tool to draw the ends of the hoop into overlapping relation and to establish the pairs of openings 35, 35' in registry with each other and with the projection 52 on the plate 46 located through alined openings 35, 35', and with the other openings 51 on plate 46 alined with the other openings 35, 35'. The workman then inserts a screw 57 through the first alined openings 35, 35' and secondly a cotter 58 through the other alined openings 35, 35', or vice versa. This is all that is necessary to hold the bottom head in place, because it is located between the inwardly extending projections 47', 49' on plate 54, and the bead 31 receives the projections 43 on said plates while the projections 52 and 55 of said plates are located in the openings 33 and 35, 35' respectively. Thus the hoop 28 at the lower end of the hogshead is held against longitudinal or lateral shifting movement.

The next step is to secure the upper hoop in place and this is accomplished substantially in the same manner as described in connection with the bottom hoop only the hoop 28 is inverted from the position of Fig. 3 so that the flange 29 rests above the staves A and B. The first step is to locate one of the projections 45 on one of the plates 43 in the opening 34 to properly center the hoop. Then the ends of the hoop are drawn together in the same manner as described in connection with the lower hoop to locate the projections 45 on other plates 43 in openings 33 while drawing the openings 35, 35' into registry.

At this time another screw 57 is inserted through one of the openings 35', screw threaded opening 41, in projections 40, (which projection is located in openings 35, 35') so that the head H may be inserted, while the staves are held at their opposite ends in substantially assembled relation by the hoops 28. If desired, however, the intermediate wire hoops 60 may be applied around the staves before applying the top hoop 28.

Although the wire hoops 60 may be secured around the hogshead at definite intervals by any suitable means, I have shown in the present application a very simple and effective means for holding said hoops in place, and consisting of relatively simple clips shown in detail in Fig. 12, and designated generally by the numeral 61. These clips are composed of opposite arms 62, 63 formed by bending a plate upon itself to provide an intermediate portion 64 spacing arms 62, 63 apart a distance substantially the same as the thickness of the staves, so that the edges of the staves may be received therebetween. The upper arm 63 is provided with a bead or channel 65 extending thereacross, and having transversely located therethrough openings 66. Also each of the arms 62, 63 are provided with openings 67 through which, and the staves to which the clips are applied, rivets or screws may be mounted to hold the clips in place on the longitudinal edges of desired staves. It is preferable to apply the respective clips to different staves so as not to weaken the staves, although the grouping or selective arrangement of the clips on the staves may be varied. For instance, one stave may receive all of the clips if desired, or two of the staves may receive two of the clips, etc.

To secure the wire hoops to the staves, each of the wires is provided at one end with a loop 68 formed by bending and twisting the wire upon itself. The wire is bent around the staves, and the free or straight end of the wire is inserted through the alined openings 66 and then through the loop 68, after which it is bent back as indicated in Fig. 1 at 69, so that it can be bent and extended through the channel 65, after which the end is bent over as at 70 to firmly hold the wire hoop around the hogshead. I find that this arrangement permits a very quick assembly and at the same time provides a very tight binding, and yet affords reuse of the wires after they have been removed, which occurs when the hogshead is disassembled and stored.

It will be noted by reference to Figs. 1 and 6, and as previously mentioned, that the nuts 25' which are secured to the ends of the bolts 25 on the interior of the hogshead are elongated so that they extend inwardly beyond the margin of the head H. These nuts constitute a definite stop to downward movement of the head H when inserting the same after filling and prising the hogshead. On the other hand, the cotters 58 which engage through the openings in the clips 29 on the ends of staves A and through openings 42 in plate 38 and openings 44 in plates 43 are spaced above the nuts 25', and are relatively long so as to constitute a definite stop to upward movement of the head which occurs when the tobacco expands after downward pressure thereon is released. The cotters 58 are preferably made of relatively strong steel, permitting their arms to be spread and yet permitting the cotters to be removed with facility simply by driving them out by force exerted on the inner ends thereof. It will also be noted that the projections 39 and 39' of plates 38, 43 respectively are seated in the bead 31 around the upper hoop 28 to further cooperate in holding the hoop in place.

Obviously, to disassemble the hogshead it is simply necessary to remove the cotters 58 by hammering them out, and remove screws 57 both at the top and bottom. This permits the hoops 28 to expand and disengage the projections 40, 45, 52, 55 from the openings 34, 33, 35, 35'. The wire hoops 60 are also readily removed by bending the ends 70 down to permit the same to be drawn through channels 65 and removed from loops 68. All of the parts are thus released and may be placed in relatively flat condition to be so stored for reuse whenever desired.

In Figs. 14–19 inclusive I have shown a modification of the invention in respect to the means for drawing and holding together the overlapping ends of the top and bottom hoops. In Figs. 14–19 the primed numerals designate the same parts as do the unprimed numerals of Figs. 1–13.

Before proceeding with a detailed description of the modification of the invention shown in Figs. 14–19, I would point out that generally the construction and arrangement of the parts is the same as that of Figs. 1–13, that is, the same attaching plates on staves A are used in connection and cooperation with openings 33' and 34', of hoops 28' and the same intermediate wire hoops 60 may also be used. The essential difference between the construction of Figs. 14–19 and that of Figs. 1–13 is that the amount of overlap of the ends of the hoops 28', which corresponds to hoops 28, is reduced and the hoops 28' have rigidly secured thereto easily operated locking elements to draw the ends of the hoops into overlapping relation and hold them in this position.

Adjacent the ends of the hoop 28' and between the bead 31' and flange 29' the hoops are provided with stamped up or raised portions 72, 72', each having openings 73 formed therethrough. On the raised portion 72 I have shown the openings 73 formed adjacent the corners thereof, and on the portion 72' have shown openings formed along the upper and lower edges, as well as one of the side edges. A keeper designated generally by the numeral 74, and in the nature of a hollow block provided at one top edge with a lip 75, is secured to one end of the hoop by inserting tongues 76 on the block through the openings 73 in the upraised portion 72' and then bending the tongues over on the inner side of the end of the hoop as shown clearly in Fig. 16.

A supporting block 77, similar to the block 74, is secured to the other end of the hoop by inserting tongues 76' through the openings 73 of the raised portion 72 and then bending the tongues 76' over as shown in Fig. 16. The block 77 is provided with a notch or opening 78 at the inner end of its wall which confronts the block 74 to receive a tongue 79 on the block 74 when the hoop is drawn together to bring the ends thereof into overlapping relation.

In order to draw the ends of the hoops and the block 74, 77 carried thereby together, I provide on the block 77 alined ears 80 having alined openings 81. As shown in Figs. 15 and 16 a pintle 82 is secured through the openings 81 and serves as a fulcrum for a lever designated generally by the numeral 83, one end of which is bent around the pintle 82 and provided with a projection or cam formation 84 engaging a leaf spring 85 secured at one end to the hoop as by a rivet 86. The lever 83 is of substantially channel formation in cross-section and has a downwardly sloping end 87, the upper wall of which is bent upon itself as at 88 to increase its strength at the free end of the lever. When the said lever 83 is in the locked or full line position of Fig. 16, the end 88 is spaced from the hoop 28', as indicated by the numeral 89, so that any suitable implement may be inserted in the space 89 to facilitate lifting of the lever to the dotted line or unlocked position of Fig. 16. A link 90 has one of its ends inserted through openings in the side walls of the lever 83 as indicated at 91 to provide a pivotal connection between the lever 83 and the link 90. The other end of the link designated by the numeral 92 is adapted to cooperate with the lip or keeper 75 and the groove 93 thereunder to hold the ends of the hoop in overlapping relation, at which time the tongue 79 is located through the notch or opening 78 the block 77, and the cam formation 84 is forced upwardly by the spring 85 to hold the lever 83 down against the hoop 28'.

The modification of the invention shown in Figs. 14–19 is particularly useful in connection with knockdown hogsheads of the type hereinbefore described when assembling the same with the aid of commercially available machines known as Gilmore assembling machines, and whereon the hogsheads are assembled in a horizontal instead of a vertical plane. It is typical of said assembling machines that the ends of the staves are closely related at the time when the final stave is inserted, so that a lever operated device of the character shown and described in connection with Figs. 14–19 may be operated by hand to draw the ends of the hoops into overlapping relation and with the end 92 of the link 90 located under the lip 75 of block 74 to hold the ends of the hoops in said overlapping relation. It will be understood, of course, that the beads 31' and the openings 33' and 34' receive the same or corresponding parts as described in connection with Figs. 1–13.

In order to knock down the hogshead it is simply necessary to insert an implement in the opening 89, raise the lever 83 to the dot and dash line position of Fig. 16, which moves the link 90 to release the end 92 from engagement from under the lip 75, so that the hoops may be immediately removed without even unloosening screws or bolts.

I wish it to be understood that the manner of securing the blocks 74 and 77 to the ends of the hoops as shown and described in connection with Figs. 14–19 is optional and that the blocks may be secured to the ends of the hoops by any other suitable and known means, such as welding, riveting or the like. Furthermore the exact details of the construction and operation of the lever operated link locking device of Figs. 14–19 may be varied considerably, the important point being to obtain, as I have found to be practical in actual practice, a simple construction and easily operated locking device operable by hand. Another feature I would point out is that when the hogshead has been knocked down, due to the fact that the inner engageable locking parts of Figs. 14–19 are rigidly secured to the ends of the hoops, the ends of the hoops may be locked together when the hoops are to be stored, thus presenting a substantially rigid hoop for storage purposes.

In Fig. 20 I have shown a further modification of the invention especially in connection with the provision of adjustability of the locking link which holds the ends of the hoops 28" which correspond to hoops 28' in overlapping relation. In Fig. 20 the primed numerals indicate the corresponding parts designated by the unprimed numerals in Figs. 14–19. The essential difference between the structure of Fig. 20 and that shown in Figs. 14–19 is that the lever 83' is provided with bayonet slots 95 to adjustably or selectively receive one end of the link 90', while the other end of the link 90' is pivoted through the block 74'. Thus if there is variance in the diameter of the hogsheads, the link 90' may be selectively engaged in any of the bayonet slots 95 to compensate for the variance in diameters.

While I have shown and described in this application the clips 61 secured to certain or any of the staves to definitely locate and maintain the wire hoops 60 around the hogshead, I wish it to be understood that devices such as shown and described in connection with Figs. 15, 16 and 20 may be attached to the ends of wires to draw the same toward each other and thus secure wire hoops tightly around the hogsheads. In other words, the devices shown and described in connection with Figs. 15, 16 and 20 may be used not only on the end hoops or bands, but may be used in connection with and attached to the ends of intermediate hoops of any character, and this is so obvious that I do not deem it necessary to illustrate the devices of Figs. 15, 16 and 20 attached to the intermediate hoops whether they be wire or plain metal bands.

I claim:

1. A knockdown hogshead comprising a plurality of staves forming the wall or sides of the hogshead, attaching plates on the ends of certain of the staves, other of the staves being arranged intermediate said certain of the staves, binding hoops encircling the ends of the hogshead and arranged around the ends of all of said staves, cooperating interfitting projections and openings on said plates on certain of the staves and on said hoops interengageable to maintain said hoops against longitudinal and lateral movements upon assembly of said hoops around said staves, and means adjacent the ends of said hoops to hold said ends of the hoops in overlapping relation.

2. A knockdown hogshead comprising a plurality of staves forming the wall or sides of the hogshead, attaching plates on the ends of certain of the staves, other of the staves being arranged intermediate said certain of the staves, binding hoops encircling the ends of the hogshead and arranged around the ends of all of said staves, cooperating elements on said plates on certain of the staves and on said hoops interengageable to maintain said hoops against longitudinal and lateral movements upon assembly of said hoops around said staves, means adjacent the ends of said hoops to hold said ends of the hoops in overlapping relation, end closures for the hogshead, and means on the plates on said certain of the staves to marginally receive at least one of said end closures during relative assembling movement of the staves and said one end closure and hold the same in place at one end of the hogshead upon assembly of the staves and hoops around said one closure.

3. A knockdown hogshead comprising a plurality of staves forming the wall or sides of the hogshead, certain of the staves having secured to the ends thereof attaching plates, binding hoops to encircle the ends of the hogshead and provided with flanges to overlay the ends of the staves, cooperating elements on said plates on said certain of the staves and on said hoops interengageable to maintain said hoops against longitudinal and lateral movements, interengageable locking means on the ends of said hoops to detachably hold said ends of the hoops in overlapping relation, other staves between said certain of the staves and held in place by said hoops upon interlocking engagement of said locking means on the ends of said hoops, end closures for said hogshead, and said plates being provided with means to engage at least one of said end closures during assembly of the staves around said closure to hold said end closure in place.

4. A knockdown hogshead comprising a plurality of staves forming the wall or sides of the hogshead, certain of the staves having secured to the ends thereof attaching plates, binding hoops to encircle the ends of the hogshead, cooperating elements on said plates on said certain of the staves and on said hoops interengageable upon relative assembling movement to maintain said hoops against longitudinal and lateral movements, interengageable locking means on the ends of said hoops to adjustably hold said ends of the hoops in overlapping relation, other staves between said certain of the staves and held in place by said hoops, end closures for said hogshead, and said plates being provided with inwardly projecting pairs of lugs to engage at least one of said end closures during assembly of the staves around said closure to hold said end closure in place.

5. A knockdown hogshead comprising a plurality of staves forming the wall or sides of the hogshead, attaching plates secured to the ends of certain of the staves, other staves arranged between said certain of the staves, binding hoops encircling the ends of the staves, interfitting elements on said plates on said certain of the staves and on said hoops to maintain said hoops against longitudinal and lateral movements, means adjacent the ends of said hoops to hold said ends of the hoops in overlapping relation, said hoops being provided with circumferential grooves or beads, and said plates being provided with lateral projections adapted to seat in said grooves or beads when the hoops are drawn around said staves.

6. A hogshead of the character described comprising a plurality of staves arranged in an annular group, top and bottom heads closing the ends of the hogshead, hoops encircling the ends of said staves, lateral projections and openings on certain of said staves and said hoops interengageable when said hoops are placed around the ends of said staves to detachably hold all of the staves in assembled relation, and means associated with said certain of the staves to detachably hold said heads in closed position at the ends of the hogshead.

7. In a hogshead of the character described, a hoop to encircle each end of the hogshead, each hoop having a lateral flange to abut the ends of the staves, and interengageable lever operated fastening elements on the ends of said hoops to detachably hold the ends of the hoops in overlapping relation, said fastening elements being constructed and arranged to impart approaching movement to said ends of the hoops during movement of said elements into locked position.

8. A hogshead of the character described comprising a plurality of staves forming the sides of the hogshead, closures for the ends of the hogshead, means on corresponding ends of certain of the staves providing channels to receive the edge of one of said closures during assembly of said staves around said closure, abutments adjacent the other ends of said certain of the staves to limit downward movement of the other closure within said hogshead, similar hoops around the ends of said staves, means to detachably hold said hoops around said staves, within the hogshead to maintain said staves in assembled relation, and quick detachable means cooperating with said means adjacent said other ends of the staves and hoops therearound to removably hold said other closure in place.

9. In a hogshead of the character described, including a plurality of staves encircled at their ends by binding hoops, end closures removably held in place at the ends of the hogshead, and wire hoops encircling the hogshead intermediate the ends thereof, clips attached to certain of the staves and comprising substantially U-shaped plates to embrace portions of the staves along the longitudinal edges thereof, one of the arms of the clips having a channel formed thereacross with alined openings provided through opposite sides of said channel, whereby the free end of the wire after being inserted through said alined openings may be inserted through a loop in the other end of the wire and then bent back and inserted through said channel to firmly but detachably hold the wire hoop around the hogshead.

WILLIAM S. LUCKETT.